(12) United States Patent
Lee et al.

(10) Patent No.: US 12,413,112 B2
(45) Date of Patent: Sep. 9, 2025

(54) STATOR ASSEMBLY OF HAIRPIN WINDING MOTOR

(71) Applicant: HYUNDAI MOBIS CO., LTD., Seoul (KR)

(72) Inventors: Jae Min Lee, Anyang-si (KR); Ik Sang Jang, Gwangju-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 208 days.

(21) Appl. No.: 18/089,988

(22) Filed: Dec. 28, 2022

(65) Prior Publication Data

US 2023/0344294 A1 Oct. 26, 2023

(30) Foreign Application Priority Data

Apr. 26, 2022 (KR) ........................ 10-2022-0051142

(51) Int. Cl.
*H02K 3/28* (2006.01)
*H02K 1/16* (2006.01)
*H02K 3/12* (2006.01)

(52) U.S. Cl.
CPC ............... *H02K 3/28* (2013.01); *H02K 1/165* (2013.01); *H02K 3/12* (2013.01)

(58) Field of Classification Search
CPC ............. H02K 3/28; H02K 3/12; H02K 1/165
See application file for complete search history.

(56) References Cited

U.S. PATENT DOCUMENTS

| 7,622,843 B2 * | 11/2009 | Cai ........................ H02K 3/28 310/179 |
| 2020/0153305 A1 * | 5/2020 | Neet ........................ H02K 3/14 |
| 2020/0169137 A1 * | 5/2020 | Tang ...................... H02K 7/006 |
| 2020/0212747 A1 | 7/2020 | Deng et al. |

(Continued)

FOREIGN PATENT DOCUMENTS

| DE | 10 2019 124 463 A1 | 3/2021 |
| JP | 2020-103038 A | 7/2020 |
| JP | 2021-145522 A | 9/2021 |

(Continued)

OTHER PUBLICATIONS

Korean Office Action issued on Oct. 28, 2023, in counterpart Korean Patent Application No. 10-2022-0051142 (6 pages in Korean).

(Continued)

*Primary Examiner* — Forrest M Phillips
(74) *Attorney, Agent, or Firm* — NSIP Law

(57) ABSTRACT

A stator assembly includes a stator core including a plurality of slots configured to penetrate through the stator core in a circumferential direction, each of the slots including a plurality of layers in a radial direction; and a plurality of hairpin coils configured to fasten and interconnect to the slots, respectively, to form a coil winding. The hairpin coils include a main coil having a first slot pitch, an anomalous coil having a second slot pitch different from the first slot pitch, and a leader coil. In each of the slots, the main coil is disposed in each of a radially innermost layer of the layers, a radially outermost layer of the layers, and an intermediate (Continued)

layer of the layers between the innermost layer and the outermost layer. The leader coil is disposed in each of the innermost layer and the outermost layer.

18 Claims, 11 Drawing Sheets

(56) References Cited

U.S. PATENT DOCUMENTS

2021/0305864 A1* 9/2021 Ahmed .................... H02K 3/12

FOREIGN PATENT DOCUMENTS

| | | |
|---|---|---|
| KR | 10-0571173 | 4/2006 |
| KR | 10-2016-0066839 A | 6/2016 |
| KR | 10-2019-0141419 A | 12/2019 |

OTHER PUBLICATIONS

Zou, Tianjie, et al. "A Comprehensive Design Guideline of Hairpin Windings for High Power Density Electric Vehicle Traction Motors." IEEE Transactions on Transportation Electrification 8.3 (2022): 3578-3593.

Extended European search report issued on Sep. 11, 2023, in counterpart European Patent Application No. 22216719.9 (18 pages).

* cited by examiner

STATOR ASSEMBLY OF HAIRPIN WINDING MOTOR

CROSS-REFERENCE TO RELATED APPLICATIONS

This application claims the benefit under 35 U.S.C. § 119 of Korean Patent Application No. 10-2022-0051142, filed on Apr. 26, 2022, in the Korean Intellectual Property Office, the entire disclosure of which is incorporated herein by reference for all purposes.

TECHNICAL FIELD

The following disclosure relates to a stator assembly of a hairpin winding motor, and more particularly, to a stator assembly which may include fewer anomalous coils and fewer hairpin coil types.

BACKGROUND

In general, a hybrid vehicle or an electric vehicle referred to as an eco-friendly vehicle may generate a driving force by an electric motor (hereinafter, referred to as a "drive motor") which obtains a torque by using electric energy.

The hybrid vehicle may be driven in an electric vehicle (EV) mode which is a pure electric vehicle mode using only power of the drive motor, or driven in a hybrid electric vehicle (HEV) mode using both torques of an engine and the drive motor as power. In addition, the general electric vehicle may be driven using the torque of the drive motor as the power.

For example, most of the drive motor used as a power source for the eco-friendly vehicle may be a permanent magnet synchronous motor (PMSM). As described above, the drive motor as the permanent magnet synchronous motor used as the power source for the eco-friendly vehicle may basically include a stator generating a magnetic flux, a rotor disposed with a predetermined gap between the stator and performing a rotational motion, and a permanent magnet installed in the rotor.

Here, the stator may include a plurality of slots positioned in an inner periphery of a stator core, and the stator coil may be wound in the slot. Accordingly, when an alternating current is applied to the stator coil, a rotating magnetic field may be generated in the stator, and a torque may be generated in the rotor by the rotating magnetic field.

Meanwhile, the drive motor may be classified into a distributed winding type drive motor and a concentrated winding type drive motor based on a method of winding the stator coil. Among these drive motors, a stator of the distributed winding type drive motor may be classified into a segment coil stator and a distributed winding coil stator based on a method of winding the coil.

The segment coil stator may be a stator formed using a method in which the coil is first formed into a predetermined shape in advance and then inserted into the slot of the stator core, and the distributed winding coil stator may be a stator formed using a method in which a coil bundle is inserted into the slot of the stator core.

On the other hand, it is known that output of the drive motor is proportional to the number of turns of the coil wound on the stator core. However, when the number of turns of the coil is increased, a size of the stator core or motor may be inevitably increased, which makes it difficult to miniaturize the motor.

A method of increasing a space factor of the coil wound on the stator core may be considered to improve the output of the motor without increasing the size of the motor. In other words, considered is the method of increasing the space factor of the coil by minimizing a dead space between the stator core and the wound coil or a dead space between respective coils.

In this regard, an avenue of using a flat coil having a square cross section (also referred to as a "flat wire" in the art) has been actively explored in recent years instead of using an annular coil having a circular cross section (also referred to as a "round wire" in the art) as the coil winding. The flat coil may reduce the dead space and improve the space factor compared to the annular coil due to its cross-sectional shape.

However, in a case of the flat coil, it may be relatively difficult to perform a coil winding operation compared to a case of the annular coil. The reason is that it is difficult to use a winding machine or the like for the flat coil because the coil has increased rigidity by being manufactured to have a wider cross-sectional area compared to that of the annular coil in order to maximize the space factor.

Accordingly, in order to facilitate the coil winding operation of the flat coil in the segment coil stator of the distributed winding type drive motor, proposed is a method of forming a continuous coil winding of the stator core by inserting and fastening a plurality of separated hairpins (each having an approximate U-shape or V-shape) into respective slots of the stator core, and then sequentially welding and bonding between the hairpins arranged in the respective slots.

A motor including the coil winding formed in this manner may also be referred to as a "hairpin drive motor" in the art. The above-described coil winding structure of the hairpin drive motor may overcome a device limitation caused by the winding machine, and implement a high-output and miniaturized motor by increasing the space factor of the coil, while enabling a relatively easy coil winding operation even in the case of the flat coil.

In the hairpin drive motor as described above, the continuous winding may be formed by inserting hairpin legs into the slot of the stator core and then welding the legs, radially adjacent to each other, in the slot. Therefore, the coil winding structure may include a section in which hairpins in different phases are adjacent to each other and which has poor insulation performance. A separate insulation structure may thus be required.

In a coil winding structure of a stator included in a hairpin drive motor according to the prior art, when a rotational direction of the motor and a lead-out position of one phase (e.g., "U" phase) are determined, positions of other phases (e.g., "V" phase and "W" phase) may be determined in the respective slots to form a predetermined pattern. In this case, a three phase lead-out part and a neutral point lead-out part may be formed in a regular pattern having a minimum pitch between the phases in order to simplify the coil winding structure of the hairpin by shortening the led-out length of the wound coil.

However, the prior art suggests the coil winding structure having the minimum pitch between the phases of the three-phase lead-out part. Therefore, the coil winding structure may include a section in which the hairpins of other phases are adjacent to each other in a direction in which the hairpin is inserted into the slot of the stator core, and a section in which the largest phase difference may occur in the adjacent sections between the phases, which may cause an insulation problem in the motor.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a stator assembly includes a stator core including a plurality of slots configured to penetrate through the stator core in a circumferential direction, each of the slots including a plurality of layers in a radial direction; and a plurality of hairpin coils configured to fasten and interconnect to the slots, respectively, to form a coil winding. The hairpin coils include a main coil having a first slot pitch, an anomalous coil having a second slot pitch different from the first slot pitch, and a leader coil. In each of the slots, the main coil is disposed in each of a radially innermost layer of the layers, a radially outermost layer of the layers, and an intermediate layer of the layers between the innermost layer and the outermost layer. The leader coil is disposed in each of the innermost layer and the outermost layer, and the anomalous coil is disposed in the intermediate layer.

In two sets of four parallel circuits in which one set includes two parallel circuits, when two hairpin coil bundles included in different parallel circuits included in one set of each phase respectively comprise a first hairpin coil bundle and a second hairpin coil bundle, any one of a first anomalous coil which is the anomalous coil of the first hairpin coil bundle and a second anomalous coil which is the anomalous coil of the second hairpin coil bundle may have a short-pitch smaller than the first slot pitch by one pitch, and another anomalous coil may have a long-pitch larger than the second slot pitch by one pitch.

One leg of the first anomalous coil and one leg of the second anomalous coil may each disposed in a same layer. Another leg of the first anomalous coil and another leg of the second anomalous coil may each disposed in another same layer.

A head portion of the first anomalous coil and a head portion of the second anomalous coil may be stacked on each other while being spaced apart from each other by a predetermined distance in a vertical direction.

One first anomalous coil and one second anomalous coil may be provided, and each of the first and second anomalous coils may be disposed in a radial center of a respective slot.

The stator core and the plurality of hairpin coils may include eight poles of forty-eight slots, and three phases of four parallels. Each of the slots may include eight layers, and the main coil may be set to six pitches to correspond to a number of the slots for each pole.

When a slot to which a phase leader coil of the first hairpin coil bundle is fastened is a first phase lead-out slot, and a slot to which a neutral-point leader coil of the first hairpin coil bundle is fastened is a first neutral point lead-out slot, a slot to which a phase leader coil of the second hairpin coil bundle is fastened may be a second phase lead-out slot, and a slot to which a neutral-point leader coil of the second hairpin coil bundle is fastened may be a second neutral point lead-out slot. Either one of the first anomalous coil and the second anomalous coil may have one leg fastened to the first neutral point lead-out slot and another leg fastened to the first phase lead-out slot. Another one of the first anomalous coil and the second anomalous coil may have one leg fastened to the second neutral point lead-out slot and another leg fastened to the second phase lead-out slot.

One first anomalous coil and one second anomalous coil may be provided. The first anomalous coil and the second anomalous coil may span a fourth layer and a fifth layer, respectively, from an innermost side of the slot.

The main coil of the first hairpin coil bundle and the main coil of the second hairpin coil bundle each may include a first type main coil spanning an eighth layer and a seventh layer from the innermost side, a second type main coil spanning a sixth layer and a fifth layer from the innermost side, a third type main coil spanning a fourth layer and a third layer from the innermost side, a fourth type main coil spanning a second layer and a first layer from the innermost side, a fifth type main coil spanning the fifth layer and the sixth layer from the innermost side, and a sixth type main coil spanning the second layer and the third layer from the innermost side.

Two first anomalous coils and two second anomalous coils may be provided. When the two first anomalous coils are a 1-1-th anomalous coil and a 1-2-th anomalous coil, respectively, and the two second anomalous coils are a 2-1-th anomalous coil and a 2-2-th anomalous coil, respectively, the 1-1-th anomalous coil and the 2-1-th anomalous coil may span the second and third layers, respectively, from an innermost side of the slot, and the 1-2-th anomalous coil and the 2-2-th anomalous coil may span the sixth and seventh layers from the innermost side, respectively.

The 1-1-th anomalous coil may have the long-pitch, the 2-1-th anomalous coil may have the short-pitch, the 1-2-th anomalous coil may have the short-pitch, and the 2-2-th anomalous coil may have the long-pitch, or the 1-1-th anomalous coil may have the short-pitch, the 2-1-th anomalous coil may have the long-pitch, the 1-2-th anomalous coil may have the long-pitch and the 2-2-th anomalous coil may have the short-pitch.

The main coil of the first hairpin coil bundle and the main coil of the second hairpin coil bundle may each include a first type main coil spanning an eighth layer and a seventh layer from the innermost side, a second type main coil spanning a sixth layer and a fifth layer from the innermost side, a third type main coil spanning a fourth layer and a third layer from the innermost side, a fourth type main coil spanning a second layer and a first layer from the innermost side, and a fifth type main coil spanning the fourth layer and the fifth layer from the innermost side.

Three first anomalous coils and three second anomalous coils may be provided, and when the three first anomalous coils are a 1-1-th anomalous coil, a 1-2-th anomalous coil, and a 1-3-th anomalous coil, respectively, and the three second anomalous coils are a 2-1-th anomalous coil, a 2-2-th anomalous coil, and a 2-3-th anomalous coil, respectively, the 1-1-th anomalous coil and the 2-1-th anomalous coil may span the second and third layers, respectively, from an innermost side of the slot, the 1-2-th anomalous coil and the 2-2-th anomalous coil may span the fourth and fifth layers from the innermost side, respectively, and the 1-3-th anomalous coil and the 2-3-th anomalous coil may span the sixth and seventh layers, respectively, from the innermost side.

The 1-1-th anomalous coil may have the long-pitch, the 2-1-th anomalous coil may have the short-pitch, the 1-2-th anomalous coil may have the short-pitch, the 2-2-th anomalous coil may have the long-pitch, the 1-3-th anomalous coil may have the long-pitch and the 2-3-th anomalous coil may have the short-pitch, or the 1-1-th anomalous coil may have the short-pitch, the 2-1-th anomalous coil may have the long-pitch, the 1-2-th anomalous coil may have the long-pitch, the 2-2-th anomalous coil may have the short-pitch, the 1-3-th anomalous coil may have the short-pitch and the 2-3-th anomalous coil may have the long-pitch.

The main coil of the first hairpin coil bundle and the main coil of the second hairpin coil bundle may each include a first type main coil spanning an eighth layer and a seventh layer from the innermost side, a second type main coil spanning a sixth layer and a fifth layer from the innermost side, a third type main coil spanning a fourth layer and a third layer from the innermost side, and a fourth type main coil spanning a second layer and a first layer from the innermost side.

The stator core and the plurality of hairpin coils may include eight poles of forty-eight slots, and three phases of four parallels. Each of the slots may include six layers, and the main coil may be set to six pitches to correspond to a number of the slots for each pole.

One first anomalous coil and one second anomalous coil may be provided, and the first anomalous coil and the second anomalous coil may span the fourth and third layers, respectively, from the innermost side.

The main coil of the first hairpin coil bundle and the main coil of the second hairpin coil bundle may each include a first type main coil spanning a sixth layer and a fifth layer from the innermost side, a second type main coil spanning a fourth layer and a third layer from the innermost side, a third type main coil spanning a second layer and a first layer from the innermost side, a fourth type main coil spanning a fourth layer and a fifth layer from the innermost side, and a fifth type main coil spanning a second layer and a third layer from the innermost side.

Other features and aspects will be apparent from the following detailed description, the drawings, and the claims.

BRIEF DESCRIPTION OF THE DRAWINGS

Throughout the drawings and the detailed description, the same reference numerals refer to the same or like elements. The drawings may not be to scale, and the relative size, proportions, and depiction of elements in the drawings may be exaggerated for clarity, illustration, and convenience.

DETAILED DESCRIPTION

Figure 1:
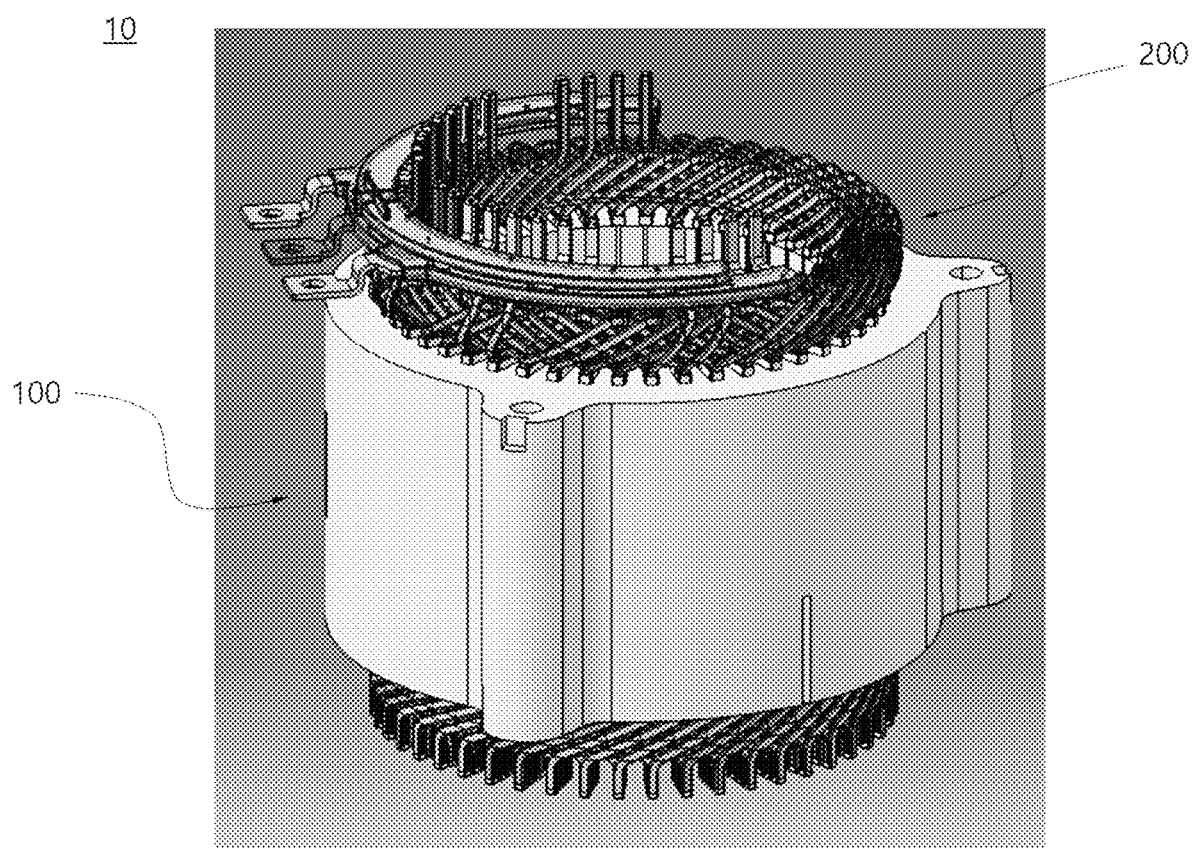
FIG. 1 is a view showing a stator assembly according to an embodiment of the present disclosure.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known after understanding of the disclosure of this application may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as shown in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes shown in the drawings may occur. Thus, the examples described herein are not limited to the specific shapes shown in the drawings, but include changes in shape that occur during manufacturing.

The features of the examples described herein may be combined in various ways as will be apparent after an understanding of the disclosure of this application. Further, although the examples described herein have a variety of configurations, other configurations are possible as will be apparent after an understanding of the disclosure of this application.

An embodiment of the present disclosure is directed to providing a stator assembly having increased insulation by reducing the number of anomalous coils.

Figure 2:
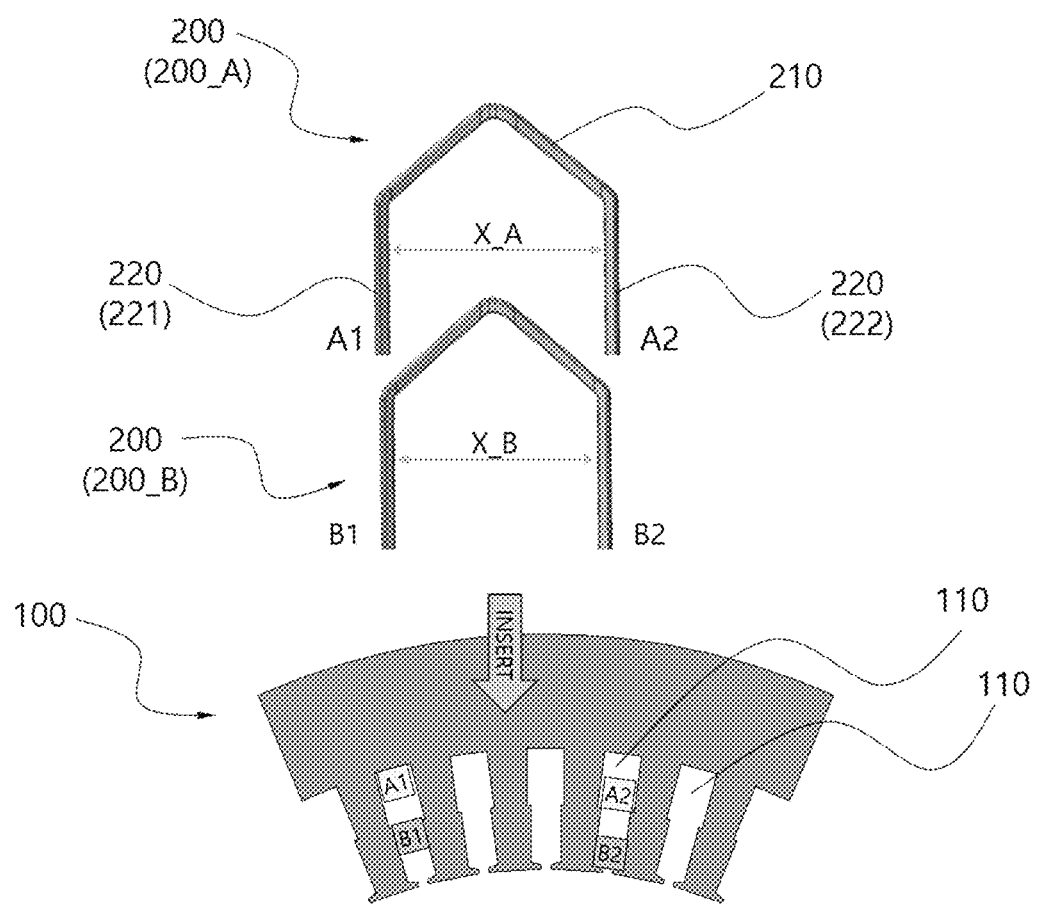
FIG. 2 is a view for explaining a structure of coupling the stator core with the hairpin coil.

FIG. 1 is a view showing a stator assembly according to an embodiment of the present disclosure, and FIG. 2 is a view for explaining a structure of coupling the stator core with the hairpin coil. As shown in FIG. 1, a stator assembly 10 of the present disclosure may roughly include a stator core 100 and a hairpin coil 200.

The stator core 100 may include a plurality of slots 110 penetrating through the core in a circumferential direction, each slot including a plurality of layers formed in a radial direction.

The plurality of hairpin coils 200 may be fastened and interconnected to the respective slots 110 to form a coil winding. Referring to FIG. 2, the hairpin coil 200 may have a U-shape or a V-shape, and include a central head portion 210 and a leg portion 220 including one leg 221 and the other leg 222 respectively extended from the head portion 210 to both sides of the head portion. Each hairpin coil 200 may have one leg 221 and the other leg 222 inserted into each layer in each slot 110, and an end of the inserted one leg 221 and an end of the other leg 222 may each be twisted and welded to one leg and the other leg of another hairpin coil adjacent thereto to form a continuous phase coil bundle. Here, one unit hairpin coil 200 as shown in FIG. 2 may be referred to as a hairpin coil specimen, a unit hairpin coil, a hairpin specimen, or simply referred to as a hairpin, and in the present disclosure, one unit hairpin coil 200 is referred to as the hairpin coil.

The plurality of hairpin coils 200 may include a main coil 201, an anomalous coil 202 having a slot pitch different from that of the main coil 201, and may further include a leader coil 203.

In general, the main coils may be the hairpin coils each having a predetermined slot pitch and regularly arranged, and most of the phase coil bundles included in the stator assembly may be formed of the main coil. Here, in a process of filling the slots and the layers, it is necessary to use the anomalous coil having a slot pitch different from that of the main coil in addition to the main coil to avoid circulating current. The anomalous coil may be classified into a short-pitch coil having a pitch smaller than the slot pitch of the main coil and a long-pitch coil having a pitch larger than the slot pitch of the main coil.

The anomalous coil may be positioned between the main coils, may thus be structurally positioned adjacent to a coil of another phase, and may have poor insulation. Therefore, it is advantageous to reduce the number of the anomalous coils to secure higher insulation. The present disclosure provides a fastening structure of the hairpin coil, which may include fewer anomalous coils, based on this point.

Hereinafter, the present disclosure is described through a specific embodiment.

Figure 3:
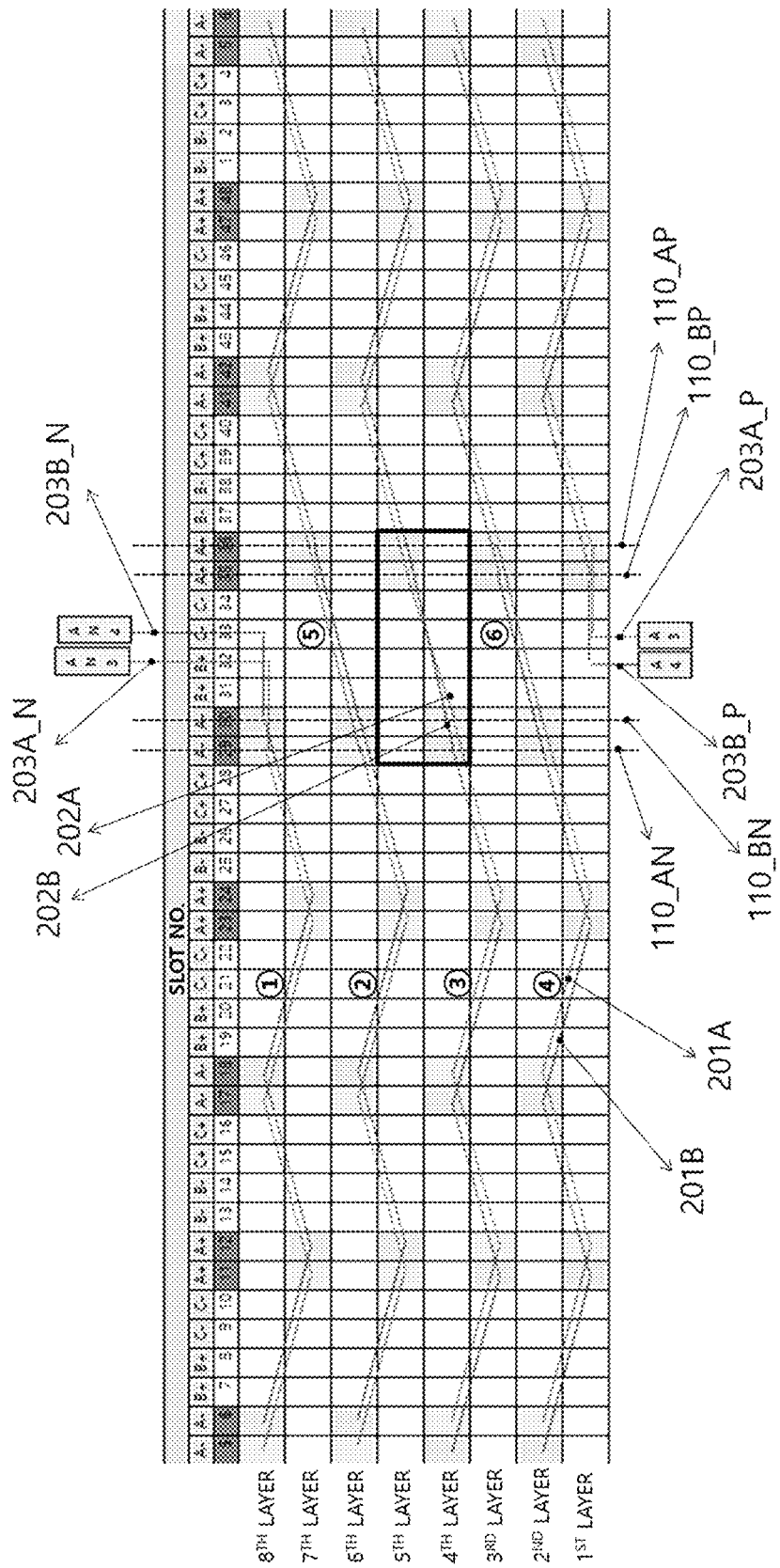
FIG. 3 is a view showing a coil winding pattern of a stator according to a first example of the present disclosure.
Figure 4:
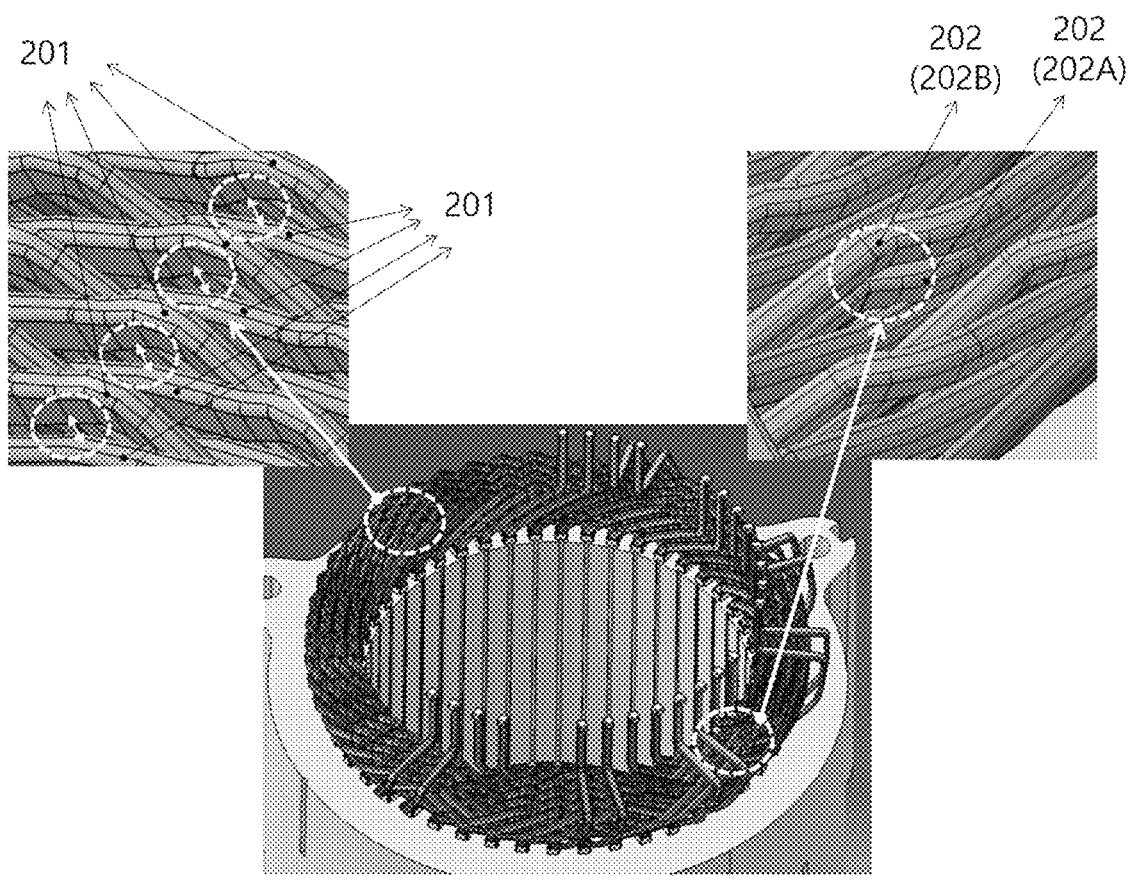
FIG. 4 is a view showing the stator assembly of FIG. 3.
Figure 5:
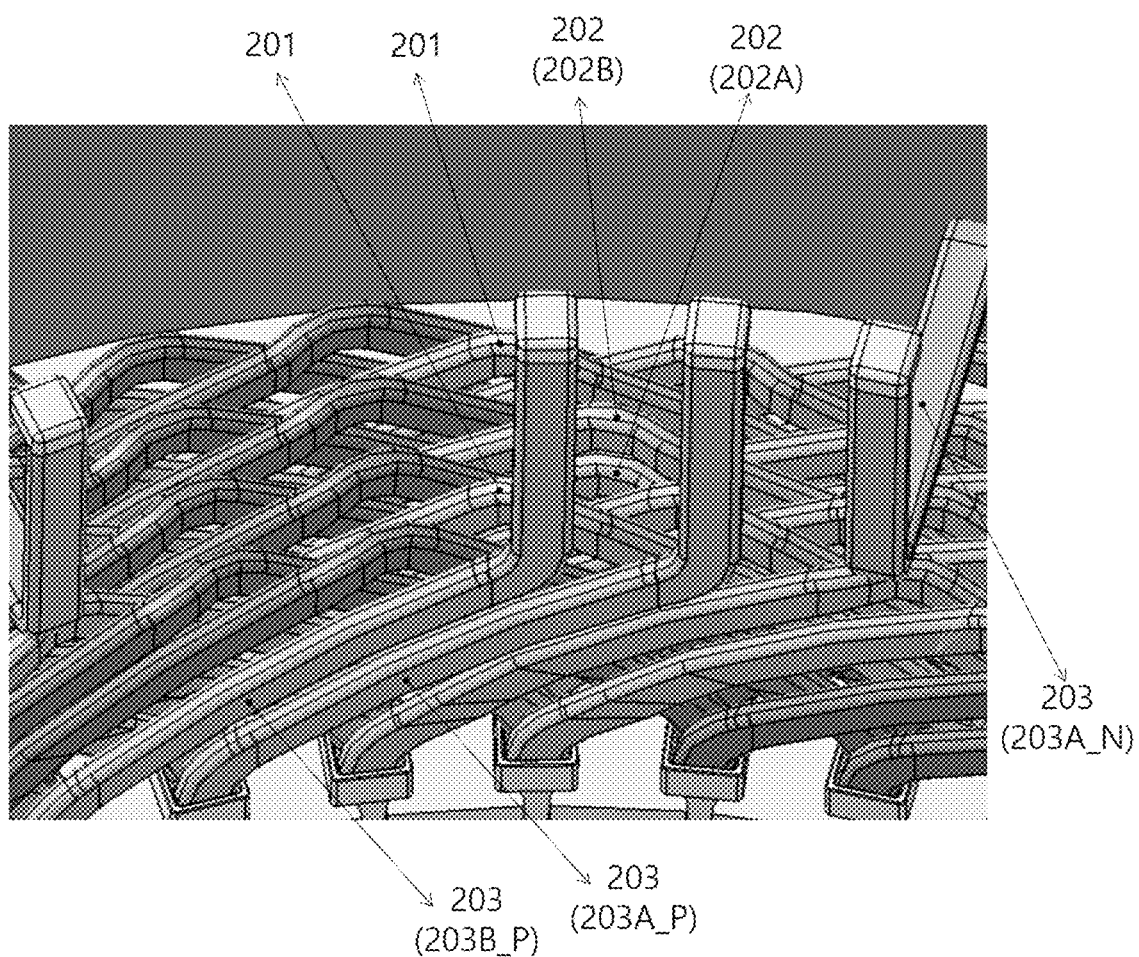
FIG. 5 is an enlarged view of an anomalous coil portion of FIG. 4.
Figure 6:
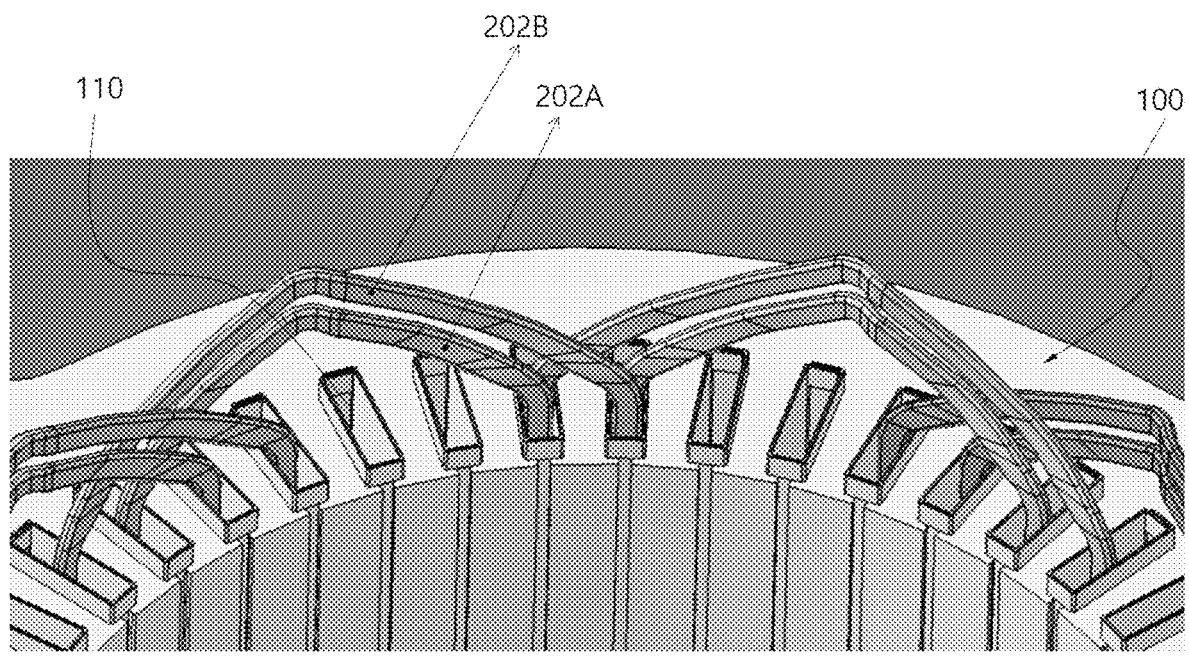
FIG. 6 is a view separately showing an anomalous coil in FIG. 4.

FIG. 3 is a view showing a coil winding pattern of a stator according to a first example of the present disclosure, FIG. 4 is a view showing the stator assembly of FIG. 3, FIG. 5 is an enlarged view of an anomalous coil portion of FIG. 4, and FIG. 6 is a view separately showing an anomalous coil in FIG. 4.

In this example, the stator assembly 10 may include eight poles of forty-eight slots, and three phases of four parallels (A1 to A4/B1 to B4/C1 to C4), and each slot may include eight layers (respectively designated as the first to eighth layers from a radially innermost side of the slot). Here, the main coil 201 may be set to six pitches, which is the number of the slots for each pole. In addition, each phase may include two sets of four parallel circuits, in which one set includes two parallel circuits.

For convenience of explanation, hairpin coil bundles each included in one set of two parallel circuits of one phase may be referred to as a first hairpin coil bundle 200A and a second hairpin coil bundle 200B, and the description is made based thereon. For example, FIG. 3 shows the first hairpin coil bundle 200A included in a third circuit A3 on a phase A and the second hairpin coil bundle 200B included in a fourth circuit A4 on the phase A.

In this case, as described above, the first hairpin coil bundle 200A may include a first main coil 201A, a first anomalous coil 202A and a first leader coil 203A; and the second hairpin coil bundle 200B may include a second main coil 201B, a second anomalous coil 202B and a second leader coil 203B. Here, the first main coil 201A and the second main coil 201B may each be set to have six pitches.

Referring again to FIG. 3, the main coil 201, i.e., each of the first main coil 201A and the second main coil 201B, may be disposed in the first layer which is the innermost layer, the eighth layer which is the outermost layer, and the second to seventh layers, which are intermediate layers between the first layer and the eighth layer; the leader coil, i.e., each of the first leader coil 203A and the second leader coil 203B, may be disposed in the first layer which is the innermost layer, and the eighth layer which is the outermost layer; and the anomalous coil 202, i.e., each of the first anomalous coil 202 and the second anomalous coil 202B, may be disposed in an intermediate layer (specifically, the fourth and fifth layers may be disposed at a radial center of the slot and details are described below).

In other words, in the present disclosure, only the main coil 201 and the leader coil 203 may be disposed in the innermost layer and the outermost layer, and the anomalous coil 202 may be disposed only at the intermediate layer except for the innermost layer and the outermost layer.

Referring to FIG. 4, the main coils 201 may be uniformly and regularly arranged as shown in the upper left of FIG. 4, which is advantageous to secure a gap between the main coil and a coil on another phase, whereas the anomalous coil 202 may be inserted between the main coils, which is disadvantageous to secure a gap between the anomalous coil and a coil on another phase as shown in the upper right of FIG. 4. Therefore, it is advantageous to reduce the number of the anomalous coils to secure the higher insulation as described above. Here, in the present disclosure, a total number of the anomalous coils may be reduced by arranging the anomalous coils at one place of the intermediate layer.

Simultaneously, in this example, any one of the first anomalous coil 202A, which is the anomalous coil of the first hairpin coil bundle 200A, and the second anomalous coil 202B, which is the anomalous coil of the second hairpin coil bundle 200B, may have 5 pitches smaller than six pitches by one pitch, and the other anomalous coil may have 7 pitches larger than six pitches by one pitch. In the example of FIG. 3, the first anomalous coil 202A may be set to 5 pitches as a short pitch, and the second anomalous coil 202B may be set to 7 pitches as a long pitch.

In addition, the first anomalous coil 202A and the second anomalous coil 202B may each be disposed to span a leader slot including the leader coil 203.

In detail, referring again to FIG. 3, a phase leader coil 203A_P of the first hairpin coil bundle 200A may be fastened to the first layer of the thirty-fifth slot, a neutral-point leader coil 203A_N of the first hairpin coil bundle 200A may be fastened to the eighth layer of the twenty-ninth slot, a phase leader coil 203B_P of the second hairpin coil bundle 200B may be fastened to the first layer of the thirty-sixth slot, and a neutral-point leader coil 203B_N of the second hairpin coil bundle 200B may be fastened to the eighth layer of the thirtieth coil. Here, a slot to which the phase leader coil 203A_P of the first hairpin coil bundle 200A is fastened may be referred to as a first phase lead-out slot 110_AP, a slot to which the neutral-point leader coil 203A_P of the first hairpin coil bundle 200A is fastened may be referred to as a first neutral point lead-out slot 110_AN, a slot to which the phase leader coil 203B_P of the second hairpin coil bundle 200B is fastened may be referred to as a second phase lead-out slot 110_BP, and a slot to which the neutral-point leader coil 203B_N of the second hairpin coil bundle 200B is fastened may be referred to as a second neutral point lead-out slot 110_BN.

The first anomalous coil 202A may have 5 pitches and the second anomalous coil 202B may have 7 pitches. Therefore, the first phase lead-out slot 110_AP and the first neutral point lead-out slot 110_AN may differ by 29 slots, and the second phase lead-out slot 110_BP and the second neutral point lead-out slot 110_BN may differ by 31 slots.

Here, as described above, the first anomalous coil 202A and the second anomalous coil 202B may each be disposed to span the leader slot including the leader coil. In detail, any one of the first anomalous coil 202A and the second anomalous coil 202B may have one leg fastened to the first neutral point lead-out slot 110_AN and the other leg fastened to the first phase lead-out slot 110_AP, and the other one of the first anomalous coil 202A and the second anomalous coil 202B may have one leg fastened to the second neutral point lead-out slot 110_BN and the other leg fastened to the second phase lead-out slot 110_BP. Here, one leg and the other leg of each of the first and second anomalous coils 202A and 202B may correspond to one leg 221 and the other leg 222 of the hairpin coil 200 described with reference to FIG. 2, referring to FIG. 3, the left leg may be referred to as one leg and the right leg may be referred to as the other leg, and the same is hereinafter described.

In the example of FIG. 3, the first anomalous coil 202A may span the second neutral point lead-out slot 110_BN and the second phase lead-out slot 110_BP, and the second anomalous coil 202B may span the first neutral point 110_AN and the first phase lead-out slot 110_AP. The anomalous coil may be disposed in the leader slot, and it is thus possible to easily identify a designated position of the anomalous coil, which is advantageous to easily manage the anomalous coil, and may be helpful to reduce misplacement or miswinding of the anomalous coil when fastening the coil.

Simultaneously, in the present disclosure, one leg of the first anomalous coil 202A and one leg of the second anomalous coil 202B may each be disposed in the same layer, and the other leg of the first anomalous coil 202A and the other leg of the second anomalous coil 202B may each be disposed in the same layer. Referring to FIG. 3, one leg of the first anomalous coil 202A and one leg of the second anomalous coil 202B may each be disposed in the fourth layer, and the other leg of the first anomalous coil 202A and the other leg of the second anomalous coil 202B may each be disposed in the fifth layer.

Accordingly, as shown in FIG. 6, a head portion of the first anomalous coil 202A and a head portion of the second anomalous coil 202B may be stacked on each other while being spaced apart from each other by a predetermined distance in a vertical direction in the drawing, i.e. in a direction in which the slot 110 is extended. The second anomalous coil 202B (or the first anomalous coil 202A) may be received inside the first anomalous coil 202A (or the second anomalous coil 202B), and it is thus possible to reduce the number of crossings between the anomalous coil and the male coil, and simultaneously, easily secure a gap between the corresponding coil and the coil of another phase.

Meanwhile, this example provides one first anomalous coil 202A and one second anomalous coil 202B, and the first anomalous coil 202A and the second anomalous coil 202B may respectively span the fourth and fifth layers. Here, the coil spanning the fourth layer and the fifth layer may indicate one leg and the other leg of the coil, which are respectively fastened to the fourth layer and the fifth layer, and the same is hereinafter described. That is, as shown in FIG. 3, in this example, one leg of the first anomalous coil 202A and one leg of the second anomalous coil 202B may each be fastened to the fourth layer, and the other leg of the first anomalous coil 202A and the other leg of the second anomalous coil 202B may each be fastened to the fifth layer. Here, the fourth layer and the fifth layer may indicate two layers positioned in a center of the slot at the eighth layer.

That is, the present disclosure provides one first anomalous coil 202A and one second anomalous coil 202B, each spanning in the radial center of the slot, thereby minimizing the number of the anomalous coils and simultaneously reducing the total hairpin coil types.

Hereinafter, the description describes a reduction in the hairpin coil types. Referring again to FIG. 2, even when the two hairpin coils have the same slot pitch, the layers to which each hairpin coil is fastened may be different from each other, and in this case, the hairpin coil types may be different from each other due to difference in a distance between the legs. That is, "A" hairpin coil 200_A shown in an upper portion and "B" hairpin coil 200_B shown in a lower portion among the two hairpin coils shown in FIG. 2 may each have the same 4-slot pitches. However, "A" hairpin coil 200_A may be inserted into an outer layer than "B" hairpin coil 200_B, and a leg width X_A of "A" hairpin coil 200_A may thus be larger than a leg width X_B of "B" hairpin coil 200_B. As described above, even when having the same slot pitch, the hairpin coils may be classified into different types, based on the layer to which the hairpin coil is fastened.

In the present disclosure based on this feature, as shown in FIG. 3, the first main coil 201A, which is the main coil of the first hairpin coil bundle, and the second main coil 201B, which is the main coil of the second hairpin coil bundle may each include a first type main coil ① spanning the eighth and seventh layers, a second type main coil ② spanning the sixth and fifth layers, a third type main coil ③ spanning the fourth and third layers, a fourth type main coil ④ spanning the second and first layers, a fifth type main coil ⑤ spanning the fifth and sixth layer, and a sixth type main coil ⑥ spanning the second and third layers.

Here, the first anomalous coil 202A may have 5 pitches as the short-pitch and the second anomalous coil 202B may have 7 pitches as the long-pitch. As a result, the present disclosure provides the phase coil bundle including a total of eight types of hairpin coils (and excluding the leader coil).

Figure 7:
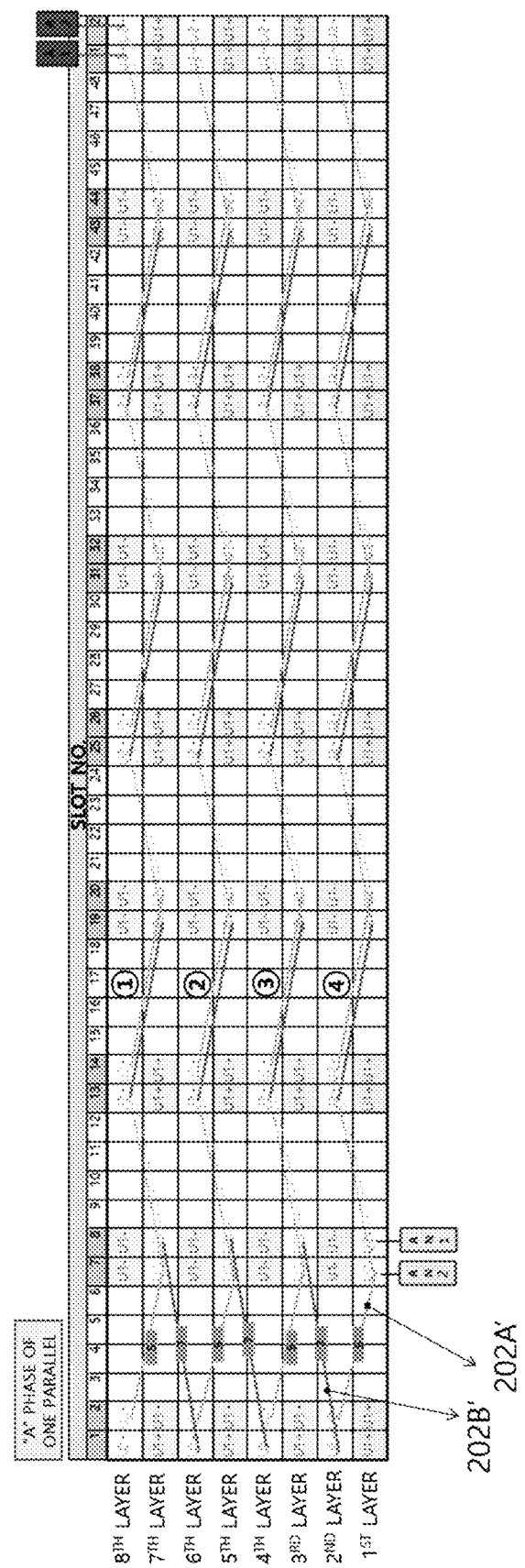
FIG. 7 is a view showing a coil winding pattern of a stator in a comparative example.
Figure 8:
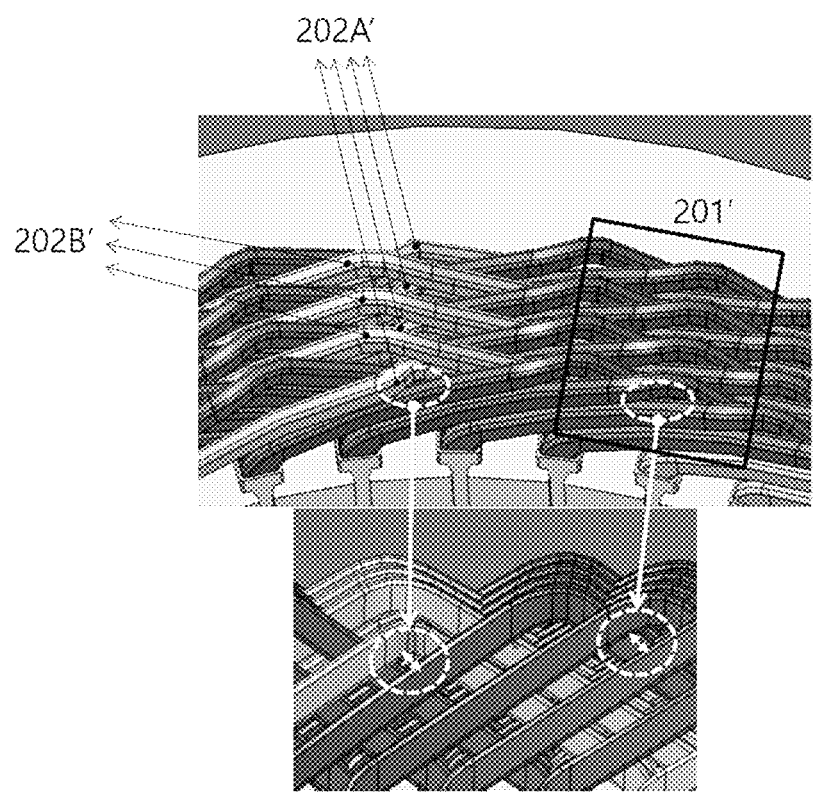
FIG. 8 is a view showing a portion of the stator assembly of FIG. 7.

Hereinafter, the description describes a comparative example of the present disclosure. FIG. 7 is a view showing a coil winding pattern of a stator in the comparative example, and FIG. 8 is a view showing a portion of the stator assembly of FIG. 7.

In the comparative example, a hairpin coil included in a first circuit A1 of "A" phase (or "U" phase, hereinafter the same) may be referred to as a first hairpin coil bundle, and a hairpin coil included in a second circuit A2 of "A" phase may be referred to as a second hairpin coil bundle. As shown in the drawings, an anomalous coil 202A' of the first hairpin coil bundle may have 5 pitches and include a total of four types of hairpin coils (in detail, a first type of hairpin coil spanning the eighth and seventh layers, a second type of hairpin coil spanning the sixth and fifth layers, a third type of hairpin coil spanning the fourth and third layers, and a fourth type of hairpin coil spanning the second and first layers); an anomalous coil 202B' of the second hairpin coil bundle may have 7 pitches and include a total of three types of hairpin coils (in detail, a first type of hairpin coil spanning the sixth and seventh layers, a second type of hairpin coil spanning the fourth and fifth layers, and a third type of hairpin coil spanning the second and third layers); a main coil 201', i.e. each of a main coil of the first hairpin coil bundle and a main coil of the second hairpin coil bundle, may include a first type of hairpin coil spanning the eighth and seventh layers, a second type of hairpin coil spanning the sixth and fifth layers, a third type of hairpin coil spanning the fourth and third layers, and a fourth type of hairpin coil spanning the second and first layers. As a result, the comparative example provides the phase coil bundle including a total of eleven types of hairpin coils (and excluding the leader coil).

That is, the comparative example provides the total of eleven types of hairpin coils, whereas the present disclosure provides the total of eight types of hairpin coils. As a result, the present disclosure may reduce the total number of the hairpin coil types, thereby improving the convenience in production management of the motor. In addition, the comparative example provides the total of seven anomalous coils, whereas the present disclosure provides the total of two anomalous coils. In this manner, the number of anomalous coils may be reduced, thereby greatly improving the insulation performance.

In other words, the present disclosure may adopt the coupling structure of the hairpin coils as described above, thereby reducing the number of the anomalous coils to improve insulation performance of the motor, and may simultaneously reduce the number of the hairpin coil types to improve the production management of the motor.

Figure 9:
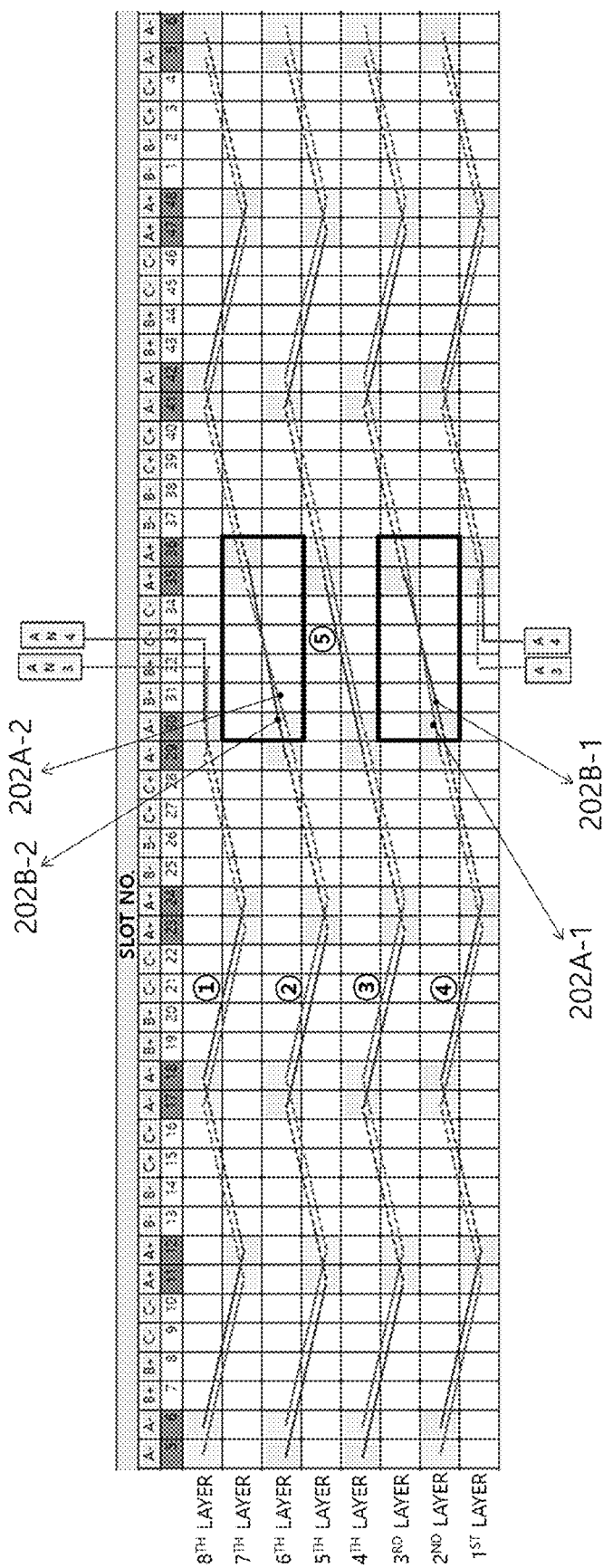
FIG. 9 is a view showing a winding pattern of a stator according to a second example of the present disclosure.

FIG. 9 is a view showing a winding pattern of a stator according to a second example of the present disclosure, and this example is different in the number and arrangement of the anomalous coils compared to the previous first example.

That is, this example provides two first anomalous coils and two second anomalous coils. Here, the first and second anomalous coils may respectively be disposed in the intermediate layers, and respectively disposed above and below the fourth and fifth layers.

In detail, when the two first anomalous coils may respectively be referred to as a 1-1-th anomalous coil 202A-1 and a 1-2-th anomalous coil 202A-2, and the two second anomalous coils may respectively be referred to as a 2-1-th anomalous coil 202B-1 and a 2-2-th anomalous coil 202B-2, the 1-1-th anomalous coil 202A-1 and the 2-1-th anomalous coil 202B-1 may respectively span the second and third layers, and the 1-2-th anomalous coil 202A-2 and the 2-2-th anomalous coil 202B-2 may respectively span the sixth and seventh layers.

Here, the 1-1-th anomalous coil 202A-1 and the 2-1-th anomalous coil 202B-1 may respectively have the short-pitch (or long-pitch) and the long-pitch (or short-pitch), and correspondingly, the 1-2-th anomalous coil 202A-2 and the 2-2-th anomalous coil 202B-2 may respectively have the long-pitch (or short-pitch) and the short-pitch (or long-pitch).

In this case, the main coil of the first hairpin coil bundle and the main coil of the second hairpin coil bundle may each include a first type main coil ① spanning the eighth and seventh layers, a second type main coil ② spanning the sixth and fifth layers, a third type main coil ③ spanning the fourth and third layers, a fourth type main coil ④ spanning the second and first layers, and a fifth type main coil ⑤ spanning the fourth and fifth layers.

This example shows that the number of the main coil types is reduced compared to those of the first example, and the anomalous coils are applied in the total of two places, thereby helping offset the difference in inductance different for each layer.

Figure 10:
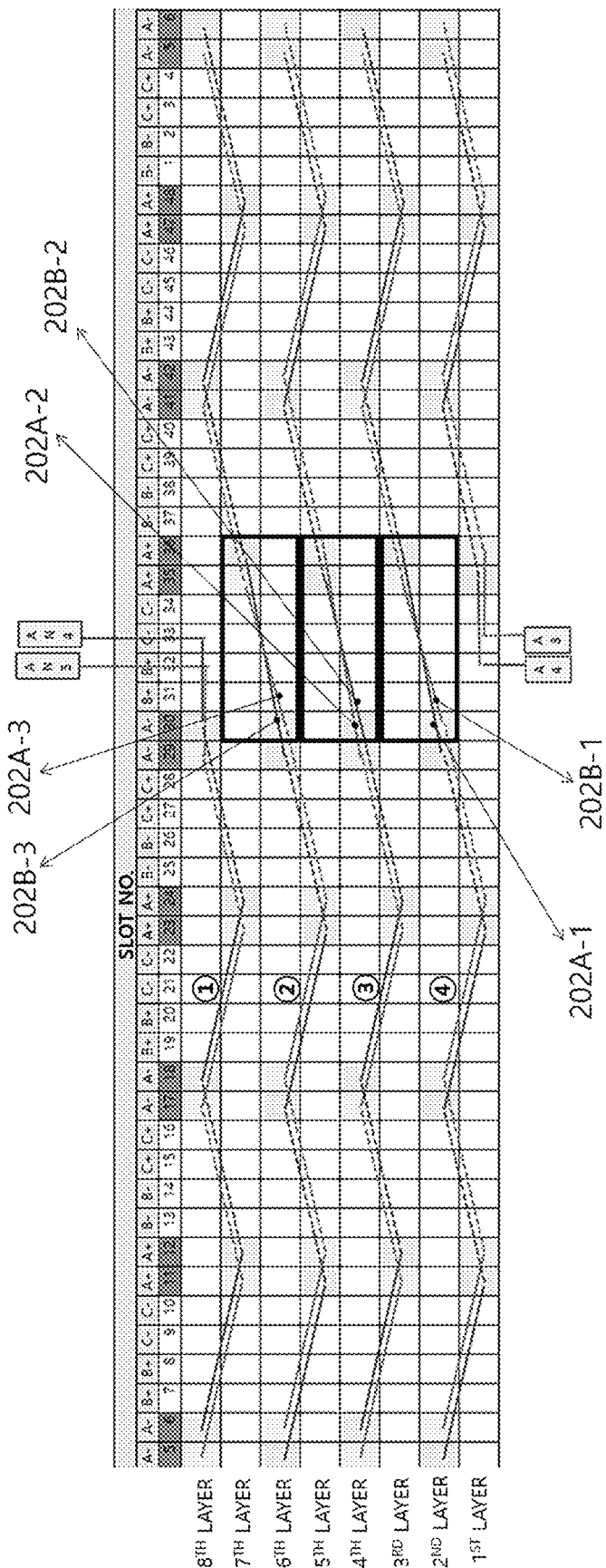
FIG. 10 is a view showing a winding pattern of a stator according to a third example of the present disclosure.

FIG. 10 is a view showing a winding pattern of a stator according to a third example of the present disclosure, and this example is different in the number and arrangement of the anomalous coils compared to the previous first and second examples.

That is, this example provides three first anomalous coils and three second anomalous coils. Here, the first, second and third anomalous coils may respectively be disposed in the intermediate layers, and disposed in the intermediate layers except for the first and eighth layers.

In detail, when the three first anomalous coils may respectively be referred to as a 1-1-th anomalous coil 202A-1, a 1-2-th anomalous coil 202A-2 and a 1-3-th anomalous coil 202A-3, and the three second anomalous coils may respectively be referred to as a 2-1-th anomalous coil 202B-1, a 2-2-th anomalous coil 202B-2 and a 2-3-th anomalous coil 202B-3, the 1-1-th anomalous coil 202A-1 and the 2-1-th anomalous coil 202B-1 may respectively span the second and third layers, the 1-2-th anomalous coil 202A-2 and the 2-2-th anomalous coil 202B-2 may respectively span the fourth and fifth layers, and the 1-3-th anomalous coil 202A-3 and the 2-3-th anomalous coil 202B-3 may respectively span the sixth and seventh layers.

Here, the 1-1-th anomalous coil 202A-1, the 1-2-th anomalous coil 202A-2 and the 1-3-th anomalous coil 202A-3 may respectively have the short-pitch (or long-pitch), the long-pitch (or short-pitch) and the short-pitch (or long-pitch), and correspondingly, the 2-1-th anomalous coil 202B-1, the 2-2-th anomalous coil 202B-2 and the 2-3-th anomalous coil 202B-3 may respectively have the long-pitch (or short-pitch), the short-pitch (or long-pitch) and the long-pitch (or short-pitch).

In this case, the main coil of the first hairpin coil bundle and the main coil of the second hairpin coil bundle may each include a first type main coil ① spanning the eighth and seventh layers, a second type main coil ② spanning the sixth and fifth layers, a third type main coil ③ spanning the fourth and third layers, and a fourth type main coil ④ spanning the second and first layers.

This example shows that the number of the main coil types is further reduced compared to those of the first and second examples, and the anomalous coils are applied in the total of three places, thereby further helping offset the difference in inductance different for each layer.

The structure described above may be generalized as follows. That is, it may be assumed that each slot includes a total of N layers (here, N may be an even number of four or more). In this case, when the hairpin coil included in one parallel circuit has an anomalous coil applied in one place, the corresponding anomalous coil may span N/2 and (N/2)+1 layers; when the hairpin coil included in one parallel circuit has anomalous coils applied in two places, any one of the two anomalous coils may span N/4 and (N/4)+1 layers, and the other anomalous coil may span 3N/4 and (3N/4)+1 layers; and when the hairpin coil included in one parallel circuit has anomalous coils applied in three places, any one of the three anomalous coils may span N/4 and (N/4)+1 layers, another anomalous coil may span 2N/4 and (2N/4)+1 layers, and yet another anomalous coil may span 3N/4 and (3N/4)+1 layers.

Further, although the above description describes that the circuit includes three phases of four parallels and the slot includes eight layers, the above-described coupling structure of the hairpin may be applied even when the circuit includes 3 phases of two parallels, and may be applied simultaneously or separately even when the slot includes four layers, six layers, eight layers or more.

Figure 11:
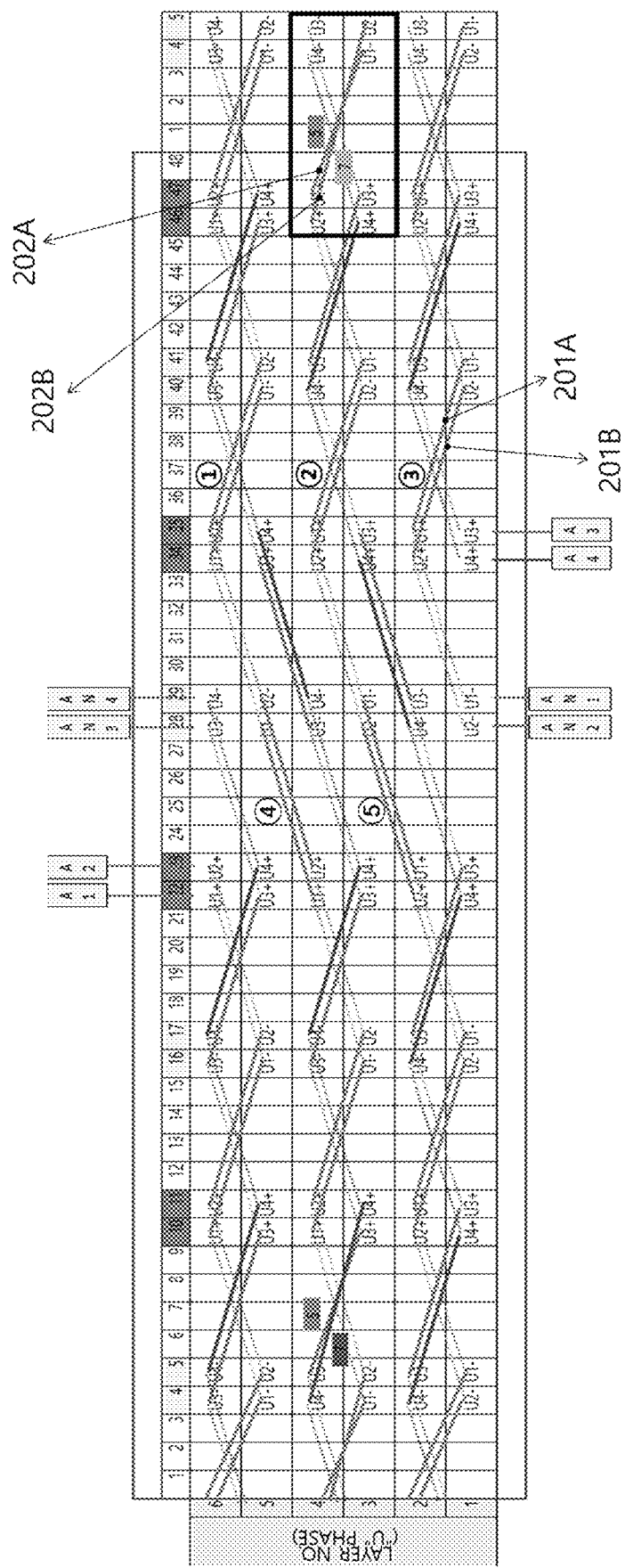
FIG. 11 is a view showing a winding pattern of a stator according to another embodiment of the present disclosure.

FIG. 11 is a view showing a winding pattern of a stator according to another embodiment of the present disclosure, and this embodiment shows that the circuit includes three phases of four parallels and the slots including six layers and a main coil set to six pitches, which is the number of the slots for each pole. That is, this embodiment is different from the previous embodiment in providing a slot including six layers, unlike the previous embodiment providing the slot including eight layers.

This embodiment provides one first anomalous coil 202A and one second anomalous coil 202B, and the first anomalous coil 202A and the second anomalous coil 202B may respectively span the intermediate layers.

In more detail, the first anomalous coil 202A may have the short-pitch (or long-pitch), and correspondingly, the second anomalous coil 202B may have the long-pitch (or short-pitch). The first anomalous coil 202A and the second anomalous coil 202B may respectively span the fourth and third layer.

In this case, the main coil 201A of the first hairpin coil bundle and the main coil 201B of the second hairpin coil bundle may each include a first type main coil ① spanning the sixth and fifth layers, a second type main coil ② spanning the fourth and third layers, a third type main coil ③ spanning the second and first layers, a fourth type main coil ④ spanning the fourth and fifth layers, and a fifth type main coil ⑤ spanning the second and third layers.

As described above, the present disclosure shows that the above-generalized coupling structure of the hairpin may also be applied to the slot including six layers.

As set forth above, according to the present disclosure, it is possible to improve the insulation performance of the motor by reducing the number of the anomalous coils, and simultaneously improve the production management of the motor by reducing the number of hairpin coil types.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A stator assembly comprising:
   a stator core including a plurality of slots configured to penetrate through the stator core in a circumferential direction, each of the slots including a plurality of layers in a radial direction; and
   a plurality of hairpin coils configured to fasten and interconnect to the slots, respectively, to form a coil winding,
   wherein the hairpin coils include a plurality of main coils having a first slot pitch, a plurality of anomalous coils having a second slot pitch different from the first slot pitch, and a plurality of leader coils,
   in each of the slots, one of the plurality of main coils is disposed in each of a radially innermost layer of the layers, a radially outermost layer of the layers, and at least one intermediate layer of the layers between the innermost layer and the outermost layer,
   one of the plurality of leader coils is disposed in each of the innermost layer and the outermost layer, and
   one of the plurality of anomalous coils is disposed in at least one of the intermediate layers.

2. The stator assembly of claim 1, wherein in two sets of four parallel circuits in which one set includes two parallel circuits, when two hairpin coil bundles included in different parallel circuits included in one set of each phase are a first hairpin coil bundle and a second hairpin coil bundle, respectively,
   any one of a first anomalous coil which is one of the anomalous coils of the first hairpin coil bundle and a second anomalous coil which is one of the anomalous coils of the second hairpin coil bundle has a short-pitch smaller than the first slot pitch by one pitch, and
   another one of the anomalous coils has a long-pitch larger than the second slot pitch by one pitch.

3. The stator assembly of claim 2, wherein one leg of the first anomalous coil and one leg of the second anomalous coil are each disposed in a same layer, and
   another leg of the first anomalous coil and another leg of the second anomalous coil are each disposed in another same layer.

4. The stator assembly of claim 3, wherein a head portion of the first anomalous coil and a head portion of the second anomalous coil are stacked on each other while being spaced apart from each other by a predetermined distance in a vertical direction.

5. The stator assembly of claim 3, wherein one first anomalous coil and one second anomalous coil are provided, and each of the first and second anomalous coils is disposed in a radial center of a respective slot.

6. The stator assembly of claim 3, wherein the stator core and the plurality of hairpin coils include eight poles of forty-eight slots, and three phases of four parallels, each of the slots includes eight layers, and the main coil is set to six pitches to correspond to a number of the slots for each pole.

7. The stator assembly of claim 6, wherein when a slot to which a phase leader coil of the first hairpin coil bundle is fastened is a first phase lead-out slot, and a slot to which a neutral-point leader coil of the first hairpin coil bundle is fastened is a first neutral point lead-out slot,
- a slot to which a phase leader coil of the second hairpin coil bundle is fastened is a second phase lead-out slot, and a slot to which a neutral-point leader coil of the second hairpin coil bundle is fastened is a second neutral point lead-out slot,
- either one of the first anomalous coil and the second anomalous coil has one leg fastened to the first neutral point lead-out slot and another leg fastened to the first phase lead-out slot, and
- another one of the first anomalous coil and the second anomalous coil has one leg fastened to the second neutral point lead-out slot and another leg fastened to the second phase lead-out slot.

8. The stator assembly of claim 7, wherein one first anomalous coil and one second anomalous coil are provided, and
- the first anomalous coil and the second anomalous coil span a fourth layer and a fifth layer, respectively, from an innermost side of the slot.

9. The stator assembly of claim 8, wherein the main coil of the first hairpin coil bundle and the main coil of the second hairpin coil bundle each includes
- a first type main coil spanning an eighth layer and a seventh layer from the innermost side, a second type main coil spanning a sixth layer and a fifth layer from the innermost side, a third type main coil spanning a fourth layer and a third layer from the innermost side, a fourth type main coil spanning a second layer and a first layer from the innermost side, a fifth type main coil spanning the fifth layer and the sixth layer from the innermost side, and a sixth type main coil spanning the second layer and the third layer from the innermost side.

10. The stator assembly of claim 7, wherein two first anomalous coils and two second anomalous coils are provided, and
- when the two first anomalous coils are a 1-1-th anomalous coil and a 1-2-th anomalous coil, respectively, and the two second anomalous coils are a 2-1-th anomalous coil and a 2-2-th anomalous coil, respectively,
- the 1-1-th anomalous coil and the 2-1-th anomalous coil span the second and third layers, respectively, from an innermost side of the slot, and
- the 1-2-th anomalous coil and the 2-2-th anomalous coil span the sixth and seventh layers from the innermost side, respectively.

11. The stator assembly of claim 10, wherein the 1-1-th anomalous coil has the long-pitch, the 2-1-th anomalous coil has the short-pitch, the 1-2-th anomalous coil has the short-pitch, and the 2-2-th anomalous coil has the long-pitch, or
- the 1-1-th anomalous coil has the short-pitch, the 2-1-th anomalous coil has the long-pitch, the 1-2-th anomalous coil has the long-pitch and the 2-2-th anomalous coil has the short-pitch.

12. The stator assembly of claim 11, wherein the main coil of the first hairpin coil bundle and the main coil of the second hairpin coil bundle each include
- a first type main coil spanning an eighth layer and a seventh layer from the innermost side, a second type main coil spanning a sixth layer and a fifth layer from the innermost side, a third type main coil spanning a fourth layer and a third layer from the innermost side, a fourth type main coil spanning a second layer and a first layer from the innermost side, and a fifth type main coil spanning the fourth layer and the fifth layer from the innermost side.

13. The stator assembly of claim 7, wherein three first anomalous coils and three second anomalous coils are provided, and
- when the three first anomalous coils are a 1-1-th anomalous coil, a 1-2-th anomalous coil, and a 1-3-th anomalous coil, respectively, and the three second anomalous coils are a 2-1-th anomalous coil, a 2-2-th anomalous coil, and a 2-3-th anomalous coil, respectively,
- the 1-1-th anomalous coil and the 2-1-th anomalous coil span the second and third layers, respectively, from an innermost side of the slot,
- the 1-2-th anomalous coil and the 2-2-th anomalous coil span the fourth and fifth layers from the innermost side, respectively, and
- the 1-3-th anomalous coil and the 2-3-th anomalous coil span the sixth and seventh layers, respectively, from the innermost side.

14. The stator assembly of claim 13, wherein the 1-1-th anomalous coil has the long-pitch, the 2-1-th anomalous coil has the short-pitch, the 1-2-th anomalous coil has the short-pitch, the 2-2-th anomalous coil has the long-pitch, the 1-3-th anomalous coil has the long-pitch and the 2-3-th anomalous coil has the short-pitch, or
- the 1-1-th anomalous coil has the short-pitch, the 2-1-th anomalous coil has the long-pitch, the 1-2-th anomalous coil has the long-pitch, the 2-2-th anomalous coil has the short-pitch, the 1-3-th anomalous coil has the short-pitch and the 2-3-th anomalous coil has the long-pitch.

15. The stator assembly of claim 14, wherein the main coil of the first hairpin coil bundle and the main coil of the second hairpin coil bundle each include
- a first type main coil spanning an eighth layer and a seventh layer from the innermost side, a second type main coil spanning a sixth layer and a fifth layer from the innermost side, a third type main coil spanning a fourth layer and a third layer from the innermost side, and a fourth type main coil spanning a second layer and a first layer from the innermost side.

16. The stator assembly of claim 3, wherein the stator core and the plurality of hairpin coils include eight poles of forty-eight slots, and three phases of four parallels,
- each of the slots includes six layers, and the main coil is set to six pitches to correspond to a number of the slots for each pole.

17. The stator assembly of claim 16, wherein one first anomalous coil and one second anomalous coil are provided, and
- the first anomalous coil and the second anomalous coil span the fourth and third layers, respectively, from the innermost side.

18. The stator assembly of claim 17, wherein the main coil of the first hairpin coil bundle and the main coil of the second hairpin coil bundle each include
- a first type main coil spanning a sixth layer and a fifth layer from the innermost side, a second type main coil spanning a fourth layer and a third layer from the innermost side, a third type main coil spanning a second layer and a first layer from the innermost side, a fourth type main coil spanning a fourth layer and a fifth layer from the innermost side, and a fifth type main coil spanning a second layer and a third layer from the innermost side.

* * * * *